Patented Aug. 28, 1951

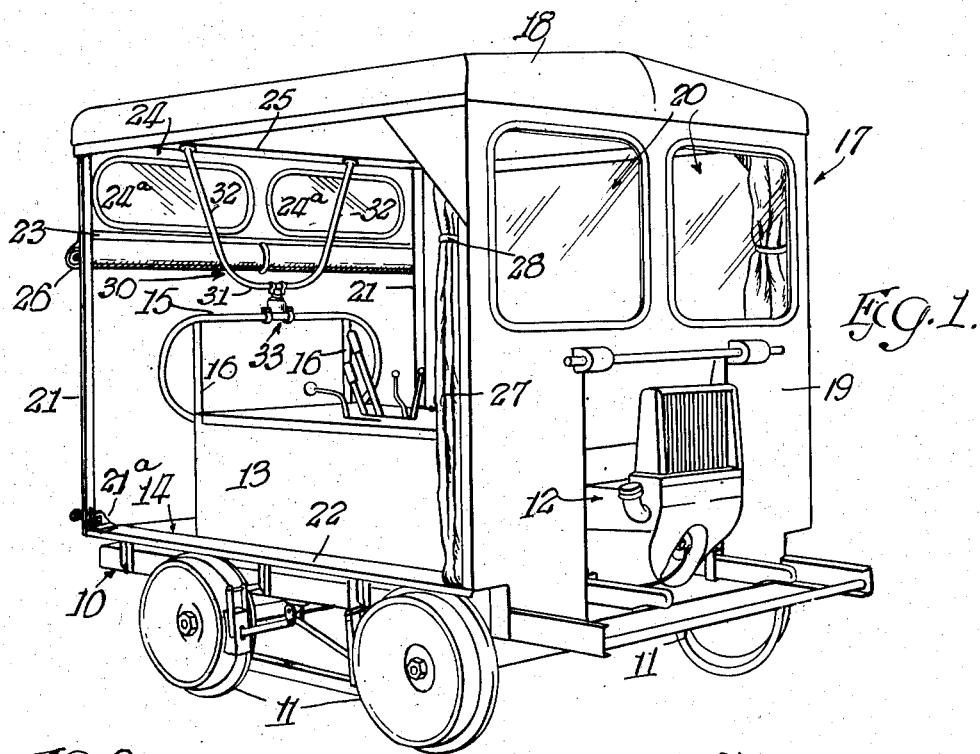
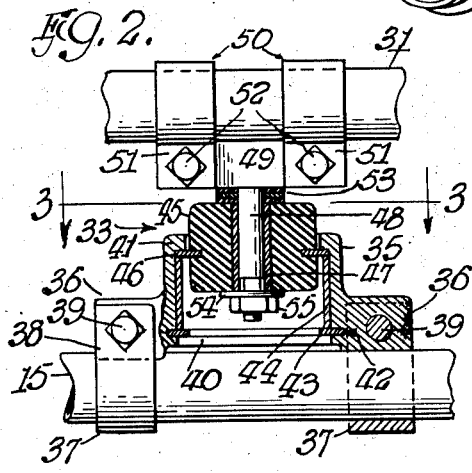
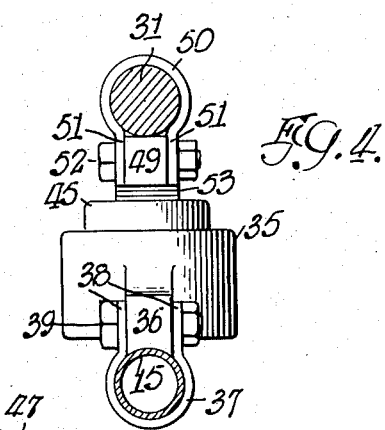
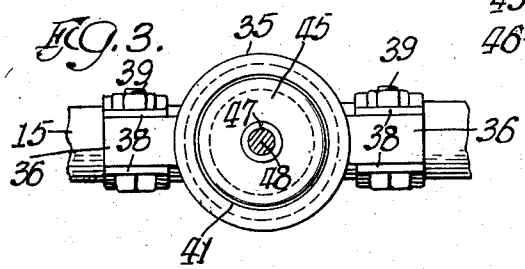
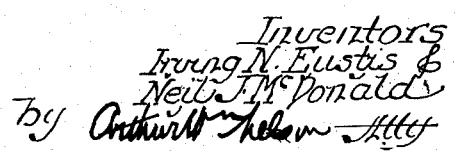

2,566,178

UNITED STATES PATENT OFFICE 2,566,178

CAB TOP MOUNTING FOR RAILWAY MOTOR CARS

Irving N. Eustis and Neil J. McDonald, Fairmont, Minn., assignors to Fairmont Railway Motors, Inc., Fairmont, Minn., a corporation of Minnesota Application July 24, 1948, Serial No. 40,507

9 Claims. (Cl. 105—406)

This invention relates to improvements in cab top mountings for railway motor cars and it consists of the matters hereinafter described and more particularly pointed out in the appended claims.

In railway motor cars, which include an enclosure or cab having a top or roof, considerable difficulty is encountered in supporting the rear end of the cab top. A railway motor car is built with a minimum of torsional rigidity in the frame so that the wheels upon which the frame is mounted will remain on the rails. However, due to unevenness in the track, over which the car operates, there is always some movement in the car frame. The front of the cab is afforded by a wall with windows therein and which in itself is quite rigid and is securely fixed to the frame.

Many structures have been tried for the support of the rear end of the cab and its top or roof and considerable difficulty has been encountered therein because of failure of the parts to stand up under the vibration transmitted thereto or through them when the car is in motion. In cars of this kind, there is generally included at the rear and above the platform, a transverse so-called safety rail, the downwardly extending legs of which are rigidly secured to the car. When this rail is used as a part of a rigid support for the rear end of the cab top, as has been the practice in the past, failure occurred either in the rail or in the parts by which the cab top was rigidly supported therefrom.

One of the objects of the present invention is to provide a simple and efficient structure, whereby one end of the cab top may be supported from the frame of the car in a manner which is in no way affected by the shocks and jars imparted to the car, upon uneven track and which will function as intended for long periods of time without failure.

Also, it is an object of the invention to provide a structure for this purpose, which may be used in connection with the rear safety rail of the motor car, without causing a failure in either the said structure or said rail.

Furthermore, it is an object of the invention to provide a novel connection for the supporting brace between the cab top and the safety rail, which connection affords a non-metal to metal contact, and whereby it is quiet in operation and absorbs and damps vibrations imparted to the safety rail of the car, due to unevenness in track.

The above mentioned objects of the invention, as well as others, together with the several advantages thereof, will more fully appear as the specification proceeds.

In the drawing:

Fig. 1 is a perspective view of a railway motor car that includes a cab embodying one form of the improved mounting for the top or roof thereof.

Fig. 2 is a view partly in side elevation and partly in vertical section through the supporting cushioned connection between the top supporting brace and the safety rail of the structure appearing in Fig. 1, but on a scale enlarged thereover.

Fig. 3 is a horizontal sectional view as taken on the line 3—3 of Fig. 2.

Fig. 4 is a view in side elevation of the parts appearing in Fig. 2.

Fig. 5 is a perspective view of a certain cushion block arranged between the cab top supporting brace and the safety rail of the car, which will be mentioned in more detail later.

Referring now in detail to that embodiment of the invention illustrated in the drawings, especially to Fig. 1 thereof wherein there is shown a railway motor car including a suitable framing 10 mounted on track-engageable wheels, 11, driven from the motor 12, a part of which appears in Fig. 1. The other part of this motor is generally enclosed in a protective housing 13 on the platform or deck 14 of the car. Rising from the car, at the rear of the housing and extending transversely of the car, is a safety rail usually made of tubing to include a top bar 15 and depending end legs 16—16 fixed at their bottom ends in any suitable manner to the framing and deck of the car. The parts thus far mentioned are conventional in railway motor cars and therefore it is not believed necessary to describe them in further detail.

The cab for the car is indicated as a whole at 17 and it includes a top 18 and a supporting front wall 19, which in itself is of a rigid construction and is rigidly secured at its bottom end to the framing of the car. In this front wall are windows 20 whereby a full view ahead is afforded for the crew riding the car.

The rear end corners of the cab top are only in part supported by upright side bars or posts 21, which are fixed at their top ends to the rear end corners of the top, one at each side of the car. The bottom ends of said bars or posts have a sliding guided spring pressed connection each with an angle bar clip 21a fixed to the rear end of the associated running board 22 whereby each bar or post can have a limited floating movement to accommodate a lateral rocking of the rear end of the roof or top when the car is in motion. A cross bar 23 connects upper end portions of these posts together and above said cross bar there is a panel 24 which is fixed to said posts 21—21, said bar 23 and to the rear cross member 25 of the top. In this panel is a pair of windows 24a giving rear vision for the crew riding the car. Associated with and below this panel is a roll curtain 26, which when unrolled coacts with the panel to form the closed rear wall for the cab. When this curtain is unrolled, its margins may be detachably engaged with the posts 21. The sides of the cab may be closed by folding side curtains 27, which when not in use, are folded back against the inner margins of the front wall 19 and secured in place as by retaining straps 28.

The rear end of the cab top is further supported from the cross bar 15 of the safety rail by means which, while additional so far as the posts 21 are concerned, really forms the main support for the rear end of the cab top. In association with and in the transverse plane of the safety rail is a substantially U-shaped supporting brace 30 for the rear end of the top. This brace includes a bottom mid portion 31 and arms 32—32 that extend upwardly and outwardly therefrom in opposite directions from said mid portion, and which are operatively secured at their top ends to the rear member 25 of the cab top 17.

The mid portion 31 of this brace is disposed at an elevation above that of the top member 15 of the safety rail and is operatively connected thereto by means of a cushioning structure 33 capable of absorbing and damping vibrations and relative movement between said brace and said safety rail and this in a manner eliminating any metal to metal contact or engagement therebetween.

The cushioning structure, which best appears in Figs. 2, 3 and 4, includes a housing 35 in the form of a hollow cylindrical body having at the bottom thereof, oppositely extending arms 36—36, transversely curved at the bottom to fit with a good seating engagement upon associated top parts of the cross bar 15 of the safety rail, as appears in Fig. 4. Clevis-like clips 37 embrace said parts of said bar and each has a pair of upper ends arms 38, one disposed upon and engaged with each side of an associated arm 36 and which arms 36—38 are clamped together by a bolt 39 and associated nut.

Within the cylindrical body of the socket member 35 is an open ended bore 40, which is restricted in diameter at the top by an inwardly extending flange 41. In the bottom end of the bore is an annular groove 42 adapted to receive a spring ring 43, that supports the bottom end of a sleeve 44 fitting in said bore.

In the upper end of the bore 40 is a cushioning member 45 in the form of a cylindrical block of rubber or other suitable resilient material, and appearing in perspective in Fig. 5. This cushioning member is of a diameter to fit within the flange 41 of the socket member and is of a length to extend above and below said flange. In the periphery of said cushioning member is molded or otherwise secured a metal ring 46, the peripherial margin of which extends under the flange 41 and engages in supporting relation upon the top edge of the sleeve 44, as appears in Fig. 2. Molded or otherwise secured centrally in the cushioning member 45 is a metallic sleeve or bushing 47 that receives the cylindrical shank 48 of a T-shaped clamping bar, which includes a transversely extending head 49 at its top end. This head engages the underside of the mid portion 31 of the brace 30 and clevis-like clips 50 surround said portions of the brace, with the depending arms 51 thereof engaged with opposite sides of end parts of the head to be secured thereto by bolts 52 and associated nuts.

Spacing washers 53 surround that part of the shank 48 between the head 49 and the top end of the sleeve 47 and another washer 54 surrounds said shank and is engaged with the bottom end of the sleeve and a nut 55 threaded on the bottom end of said shank abuts against the washer 54.

It is to be noted from Fig. 2 that there is no metal to metal engagement between the parts carried by the mid portion 31 of the brace 30 and the housing 35 and therefore such relative movement as may occur between such parts, due to vibration produced by car movement upon the rails, is absorbed in and damped by the cushioning member 45. Thus this member functions as a quiet and efficient universal joint connection of limited movement between the safety rail and the brace 30 and which can accommodate, without noise or failure, all relative movements in any direction between said safety rail and brace.

From the foregoing it is obvious that the front wall or panel is rigid with respect to the car body and that as the front end of the top is fixed to said wall or panel, it will move therewith. However, by reason of the connecting structure 33, the rear end of the cab top is capable of a limited amount of movement in all directions relatively to safety rail and this without failure of the parts involved due to vibration when the car is in motion.

While in describing the invention we have referred in detail to the form, construction and arrangement of the parts embodied in the invention, the same is to be considered only in the illustrative sense and therefore we do not wish to be limited thereto except as may be specifically set forth in the appended claims.

We claim as our invention:

1. A cab top mounting for railway motor cars embodying therein a member extending transversely of and operatively connected to the cab top, a second member extending transversely of and above the car frame and operatively connected thereto, supporting means for a part of the cab top and having a part operatively connected to said first mentioned member, and means operatively connecting another part of said supporting means to the second mentioned member and having a resilient cushioned connection therewith.

2. A cab top mounting for railway motor cars embodying therein a member extending transversely of and operatively connected to the cab top, a second member extending transversely of and above the car frame and operatively connected therewith, supporting means for a part of the cab top and including a substantially U-shaped member, a connection for the sides of said U-shaped member with one of the first mentioned members, a connection for a mid part of said U-shaped member with the other of said first mentioned members, said last mentioned connection including resilient cushioning means.

3. A cab top mounting for railway motor cars embodying therein a member extending transversely of and operatively connected to the cab top, a second and metallic member extending transversely of and above the car frame and operatively connected thereto, supporting means for a part of the cab top and including a metallic member having a part operatively connected to the first mentioned member, means for connecting a second part of said metallic member of the supporting means to said second and metallic member, said last mentioned means including a block of resilient material securely attached to both of said metallic members and which prevents contact therebetween.

4. A cab top mounting for railway motor cars embodying therein a member extending transversely of and operatively connected to the cab top, a second and metallic member extending transversely of and above the car frame and operatively connected thereto, supporting means for a part of the cab top and including a metallic member having a part operatively connected to the first mentioned member, means for connecting a second part of said metallic member of the supporting means to said second and metallic member, said last mentioned means including a block of resilient material attached at its periphery to one of said metallic members and attached centrally to the other of said metallic members and preventing contact of said metallic members with each other.

5. A cab top mounting for railway motor cars embodying therein a member extending transversely of and above the frame of the car, a housing operatively secured to a central portion of said member, a U-shaped member including a mid portion and upwardly extending arms operatively attached at the upper end to laterally spaced parts of the top of the cab, resilient cushioning means operatively attached at its periphery to said housing, and a member operatively connecting a central portion of said cushioning means to the mid portion of said U-shaped member.

6. A cab top mounting for railway motor cars embodying therein a member extending transversely of and above the frame of the car, a housing operatively secured to a central portion of said member, a U-shaped member including a mid portion and upwardly extending arms operatively attached at the upper end to laterally spaced parts of the top of the cab, resilient cushioning means operatively attached at its periphery to said housing, and a member fixed to the mid portion of said U-shaped member and including a stem passing downwardly through the center of said cushioning means and operatively secured thereto.

7. A cab top mounting for railway motor cars embodying therein a member extending transversely of and above the frame of the car, a housing secured to a central portion of said member and including an inwardly extending flange at the top, a U-shaped member including a mid portion and upwardly extending arms operatively attached at their upper ends to laterally spaced parts of the top of the cab, a block of resilient cushioning material having a portion disposed in said housing, a ring in the periphery of said block and engaged with one side of said flange, means in said housing and engaged with said ring for holding it in operative position in said housing, and means operatively connecting a central portion of said block to the mid portion of said U-shaped member.

8. A railway motor car embodying therein a car body, a rigid upright panel at one end of said body and forming a part of a cab therefor, a top for said cab fixed at one end to said panel and extending toward the other end of the car body, a member extending transversely of and secured to said other end of said car body, a second member vertically spaced above the first member and including portions fixed to laterally spaced points of the associated end of said top, and means providing a connection between the mid portions of both members and which connection includes a resilient block like cushion permitting a limited relative movement between said members in all directions.

9. A cab top mounting for railway motor cars embodying therein a member extending transversely of and above the frame of the car and having a horizontal central portion, a U-shaped member having a mid portion parallel with and spaced above the first mentioned portion and arms extending upwardly from said mid portion and attached at their upper ends to laterally spaced parts of the top of the cab, a housing fixed to one of said portions and extending toward the other of said portions, a block of resilient material having at least a part thereof disposed in said housing, a ring projecting laterally from the periphery of said block, means providing parts fixed with respect to the housing and engaging opposite faces of said ring for holding the latter in position in said housing, and means connecting a central part of said block to the other of said portions.

IRVING N. EUSTIS.
NEIL J. McDONALD.

REFERENCES CITED

The following references are of record in the file of this patent:

UNITED STATES PATENTS

| Number | Name | Date |
| --- | --- | --- |
| 1,810,718 | Lord | June 16, 1931 |
| 2,019,052 | Lord | Oct. 29, 1935 |